United States Patent [19]
Ruegg

[11] Patent Number: 5,494,387
[45] Date of Patent: Feb. 27, 1996

[54] UNIVERSAL APPARATUS FOR CARGO LASH TENSIONING

[76] Inventor: Thomas A. Ruegg, Kitchell Rd., Convent Station, N.J. 07961

[21] Appl. No.: 227,052

[22] Filed: Apr. 13, 1994

[51] Int. Cl.$^6$ .................................................. B61D 45/00
[52] U.S. Cl. ..................... 410/103; 410/100; 24/69 ST; 24/69 CT
[58] Field of Search ..................... 410/11, 12, 97–103, 410/105; 24/69 ST, 69 CT, 69 TT

[56] References Cited

U.S. PATENT DOCUMENTS

| | | | |
|---|---|---|---|
| 3,099,055 | 7/1963 | Huber | 410/103 |
| 3,377,044 | 4/1968 | Jackson et al. | 410/100 |
| 3,428,331 | 2/1969 | Morgan et al. | 410/100 |
| 4,227,286 | 10/1980 | Holmberg | 410/103 |
| 4,510,652 | 4/1985 | van Iperen | 410/101 |
| 4,900,203 | 2/1990 | Pope | 410/100 |
| 4,913,608 | 4/1990 | Royball | 410/100 |
| 5,156,506 | 10/1992 | Bailey | 410/100 |

OTHER PUBLICATIONS

Thomas, "Cargo Control Equipment", 6 pages.

*Primary Examiner*—Michael S. Huppert
*Assistant Examiner*—Gregory A. Morse
*Attorney, Agent, or Firm*—Rohm & Monsanto

[57] ABSTRACT

A tensioning apparatus for a cargo lashing strap that secures cargo to a cargo deck and is configured to have a frame having a first portion adapted to couple the frame to the cargo deck an intermediate portion, and a second portion. The frame has two side walls extending continuously therealong and are generally parallel to one another in the first and second portions, and taper in the intermediate portion. A spindle receives the cargo lashing strap and extends through apertures in the side walls in the second portion of the frame. The spindle is provided with an axial slot therethrough for engaging the cargo lashing strap. Ratchet wheels arranged on the first and second spindle ends, rotate with the spindle. An adapter facilitates engagement and disengagement of a torquing lever with the spindle. A pawl shaft has ends that extend through apertures in both side walls in the second portion of the frame. Pawls on the pawl shaft ends rotate with the pawl shaft between engaged and disengaged positions with respect to the ratchet wheel. The tensile force on the cargo lash must be overcome to achieve disengagement of the pawls and ratchet wheels. The pawls have integrally formed therewith respective manipulable handle portions for facilitating manipulated movement of the pawls between the engaged and disengaged positions. A biasing element applies a resilient force to the pawl shaft to urge the pawl toward the engaged position. Some embodiments are provided with a quick release arrangement for releasing quickly and conveniently the tensile force on the lashing strap.

20 Claims, 5 Drawing Sheets

UNIVERSAL APPARATUS FOR CARGO LASH TENSIONING

BACKGROUND OF THE INVENTION

1. Field of the Invention

This invention relates generally to arrangements for securing cargo during transportation, and more particularly, to an apparatus that is universally adaptable to tension lashes for cargo transported on a deck or platform of a vehicle.

2. Description of the Related Art

Tensioning devices for cargo lashing straps have been used to tighten the straps in increments that are responsive to the characteristics of a ratchet and pawl. Such arrangements employ a handle that permits the operator to apply a torque that increases the tension on the cargo lash. The handle, however, adds to the cost of the unit. Not only is the tensioning handle structurally complex in that a driving pawl is mechanically engaged therewith, the tensioning handle is not removable from the tensioning unit. Thus, each unit will have an associated tensioning handle. There is a need for a cargo lash tensioner wherein the tensioning torque is applied by operation of a removable tool that can be used on all like tensioners.

Known cargo lash tensioners are adapted to take-up the cargo lash on a spindle. This requires that the length of the strap be such that the length thereof which must be taken-up to achieve the desired tension not exceed the radius of the space available as the cargo lash is wound on the spindle. There is a need in the art for a cargo lash tensioner system that is able to accommodate very long lengths of excess cargo lash, without requiring the lash to be shortened for the given application.

In addition to the foregoing, there is a need for a cargo lash tensioner that is easily adapted to a variety of deck couplers. Cargo decks are available with a variety of cargo lashing fastening facilities. Some known deck couplers constitute a plate with an aperture therethrough, the aperture-bearing plate being welded or otherwise affixed to the surface of the cargo deck. Other known cargo deck are provided with openings therein that are configured to a predetermined shape that engages with a mating portion coupled to the cargo lash. There is a need in the present state of the art for a cargo lashing arrangement that can be configured universally to a wide variety of deck couplers.

In very heavy duty environments, as would be the case with trucking of heavy cargo or marine shipping, it is particularly important the cargo lashing straps be tightened to very high loads and that the tensioning unit provide a secure tension hold. That is, the load beating surfaces should not rely only upon a friction communication to maintain the tension, but rather should positively be engaged with one another, preferably in a manner that would require the tension on the cargo lash itself to be overcome to achieve disengagement of the holding mechanism prior to relaxation of the tension on the lash.

In addition to the foregoing, there is a need for a heavy duty cargo lashing system that affords a quick and safe tension release. Such a quick release feature is particularly useful in military applications where very rapid unloading of cargo is essential to the safety of personnel during military missions.

It is, therefore, an object of this invention to provide a tightening device for a cargo lashing strap that secures heavy loads to the platform of a vehicle.

It is another object of this invention to provide a lashing strap tightening device that can universally be coupled to any of several types of couplers attached to the platform of the vehicle.

It is also an object of this invention to provide a tightening device for a cargo lashing strap that employs a removable tightening handle.

It is a further object of this invention to provide a tightening device for a cargo lashing strap that easily is operated by right- or left-handed operators.

It is additionally an object of this invention to provide a tightening device for a cargo lashing strap that can sustain extremely high loads.

It is yet a further object of this invention to provide a tightening device for a cargo lashing strap that easily can be disassembled.

It is also another object of this invention to provide a tightening device for a cargo lashing strap in which the parts thereof are readily replaceable.

It is yet an additional object of this invention to provide a tightening assembly for a cargo lashing strap that employs replicated parts to minimize the number of different parts in the assembly.

It is still another object of this invention to provide a cargo lash tensioner in which tensioning can be achieved without the need of special tools.

It is a yet further object of this invention to provide a tightening device for a cargo lashing strap that can easily be manufactured to couple to any of a number of deck couplers.

SUMMARY OF THE INVENTION

The foregoing and other objects are achieved by this invention which provides in a first aspect thereof, a tensioning apparatus for a cargo lashing strap. The cargo lashing strap is of the type that secures a cargo to a support base, such as the deck of a motor truck, railroad car, or a vessel. According to the invention, a frame is provided having a first portion adapted to couple the frame to the support base, an intermediate portion, and a second portion that engages with the cargo lashing strap. The frame has first and second side walls each extending continuously along the first, intermediate, and second portions of the frame. The first and second side walls are parallel to each other in the first and second portions, and tapering in the intermediate portion. A first cross member couples the first and second side walls to each other in the intermediate portion of the frame. A spindle receives the cargo lashing strap, and has first and second spindle ends arranged to extend through apertures in the first and second side walls in the second portion of the frame. The spindle ends extend outward of respective ones of the first and second side walls. First and second ratchet wheels are arranged on respective ones of the first and second spindle ends, for rotating with the spindle. A pawl shaft having first and second pawl shaft ends is arranged to extend through apertures in the first and second side walls in the second portion of the frame, whereby the pawl shaft ends extend outward of respective ones of the first and second side walls. First and second pawl members are arranged on respective ones of the first and second pawl shaft ends, for rotating with the pawl shaft between engaged and disengaged positions with respect to respective ones of the first and second ratchet wheels. A biasing element, which is coupled to the first cross member, applies a resilient force to the pawl shaft so as to urge the first and second pawl members rotatively toward the engaged position.

In one embodiment of the invention, the pawl shaft is rotatively coupled to the first cross member. The pawl shaft is provided, in certain embodiments, with a flattened portion. A biasing element, which may include a compression spring, is coupled to the first cross member and extends to communicate with the flattened portion of the pawl shaft. An adjustment arrangement is provided for adjusting a compression loading on the compression spring, and correspondingly adjusting the magnitude of the force that urges the pawl members toward the engaged position.

A tightening torque is provided to the spindle via a torquing adapter coupled to one of the spindle ends. The applied torque causes any slack in the cargo lash to be taken up. In some embodiments, the torquing adapter may be in the form of an aperture that is formed into the end of the spindle and adapted to receive a standard ratchet drive wrench. In one practical embodiment of the invention, the aperture will accommodate a ¾" drive ratchet wrench.

In a highly advantageous embodiment of the invention, at least one of the pawl members is provided with a manipulable handle portion for facilitating manipulated movement of the first and second pawl members simultaneously between the engaged and disengaged positions with respect to respective ones of the first and second ratchet wheels. The manipulable handle portion can, in certain embodiments, be formed integrally with the at least one of the pawl members. Such an integrally formed pawl and manipulable handle would have a generally L-shaped configuration. In other embodiments, L-shaped pawls and their associated manipulable handles may be provided on both ends of the pawl shaft.

In a further embodiment of the invention, a second cross member is arranged at the juncture of the first and intermediate portions of the frame. This cross member serves to strengthen the frame, whereby its suitability for extremely high load capacities is increased. Additionally, there is further provided cargo lash guide coupled to the first and second side walls in the second portion of the frame, and arranged on the other side of the spindle with respect to the pawl shaft. The lash guide functions to strengthen the frame in the second portion thereof, and also to ensure that the loading forces are directed substantially longitudinally along the frame.

In accordance with a further aspect of the invention, a system is provided for lashing a cargo to a deck, deck being of the type having a lash coupler affixed thereto. The system is of the type which employs a lashing strap for securing the cargo. A coupler arranged as a frame has first and second portions coupled to one another, the first portion being adapted to couple with the lash coupler, and the second portion being arranged to couple to the lashing strap. The second portion is further provided with a spindle having a slot for engaging with the lashing strap, the spindle being arranged to traverse the frame of the coupler and further being rotatable with respect thereto. A ratchet wheel is coupled to the spindle and is arranged external of the frame. A pawl shaft traverses the frame and is rotatable with respect to the frame of the coupler. A pawl, which is coupled to the pawl shaft, rotates with the pawl shaft so as to move between engaged and disengaged positions with respect to the ratchet wheel. The pawl is urged to rotate toward the engaged position with respect to the ratchet wheel by operation of a resilient biasing member. This force is countered by a handle coupled to the pawl whereby the pawl is urged toward the disengaged position with respect to the ratchet wheel.

In a highly advantageous embodiment of this further aspect of the invention, the coupler is additionally provided with a further ratchet wheel coupled to the spindle at a distal end thereof with respect to the ratchet wheel and arranged external of the frame. A further pawl is coupled to the pawl shaft, for rotating with the pawl shaft between engaged and disengaged positions with respect to the further ratchet wheel.

A torquing adapter is coupled to one end of the spindle for facilitating the application of torque thereto for tightening the lashing strap. The torquing adapter may, in one embodiment, be in the form of an annular member that is provided with a plurality of radial holes for facilitating engagement of a tightening tool whereby a human operator can apply a torque to the torquing adapter. In other embodiments, the torquing adapter may be an integrally formed aperture in the spindle for engaging a drive member of a wrench. As previously discussed, the wrench may be a conventional square drive ratchet wrench, and accordingly, it is not required that a special tightening tool be provided.

In accordance with a further aspect of the invention, there is provided a tensioning apparatus for a cargo lashing strap of the type that secures a cargo to a cargo deck. The tensioning apparatus is configured to have a frame having a first portion adapted to couple the frame to the cargo deck, an intermediate portion, and a second portion. The frame is further provided with first and second side walls that extend continuously along the first, intermediate, and second portions of the frame. The first and second side walls are generally parallel to one another in the first and second portions, and tapering in the intermediate portion. A first cross member couples the first and second side walls to one another in the vicinity of the juncture between the first and intermediate portions of the frame, and a second cross member couples the first and second side walls to one another in the vicinity of the juncture between the second and intermediate portions of the frame. A spindle receives the cargo lashing strap, the spindle having first and second spindle ends that are arranged to extend through apertures in the first and second side walls in the second portion of the frame. Thus, the first and second spindle ends extend outward of respective ones of the first and second side walls. The spindle is provided with an axial slot therethrough for engaging the cargo lashing strap, as previously described. An adapter is coupled to the spindle for facilitating engagement and disengagement of a torquing lever, also as previously described. A ratchet wheel arranged on one of the first and second spindle ends, rotates with the spindle. A pawl shaft having first and second pawl shaft ends is arranged to extend through apertures in the first and second side walls in the second portion of the frame. The first and second pawl shaft ends extend outward of respective ones of the first and second side walls, the pawl shaft being rotatively coupled to the second cross member. A pawl is arranged on one of the pawl shaft ends, for rotating with the pawl shaft between engaged and disengaged positions with respect to the ratchet wheel. The pawl in this embodiment has integrally formed therewith a manipulable handle portion for facilitating manipulated movement of the pawl between the engaged and disengaged positions with respect to the ratchet wheel. As previously mentioned, a biasing element coupled to the second cross member applies a resilient force to the pawl shaft so as to urge the pawl toward the engaged position. A cargo lash guide coupled to the first and second side walls in the second portion of the frame is arranged to be on the other side of the pawl shaft with respect to the spindle.

BRIEF DESCRIPTION OF THE DRAWING

Comprehension of the invention is facilitated by reading the following detailed description, in conjunction with the annexed drawing, in which.

DETAILED DESCRIPTION

Figure 1:
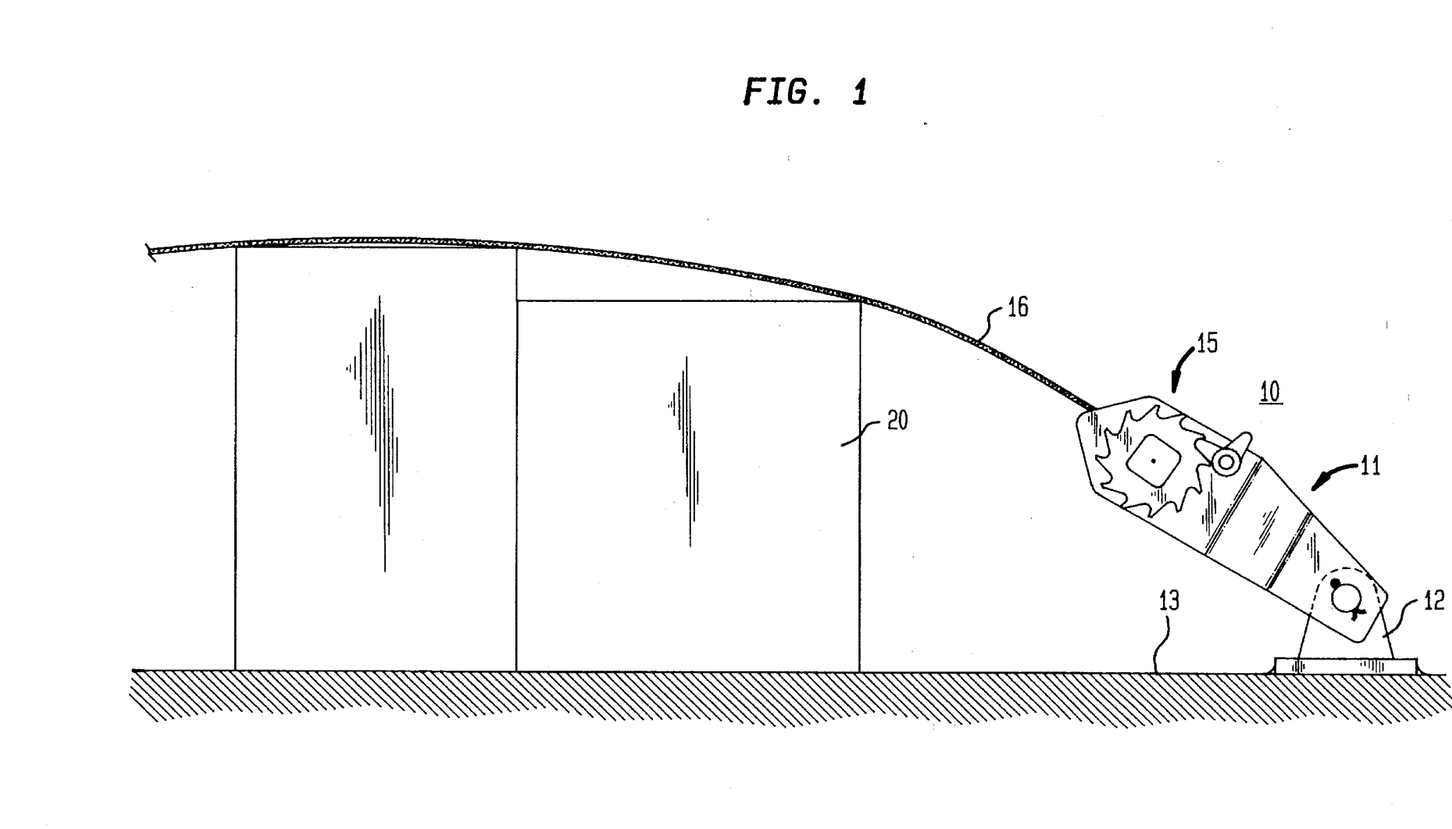
FIG. 1 is a plan view of an embodiment of the invention shown coupled to a coupler on a deck and arranged in use to secure a cargo.

FIG. 1 is a plan view of a cargo lash tensioner 10 constructed in accordance with the principles of the invention. As shown, cargo lash tensioner 10 is engaged at a first portion 11 thereof with a deck coupler 12. Deck coupler 12 is fixed to a deck 13 of a vehicle (not shown), such as by being welded, bolted, or otherwise coupled thereto. Cargo lash tensioner 10 is coupled at a second portion 15 thereof to a cargo lash 16. Any slack in cargo lash 16 is taken up by cargo lash tensioner 10, such that the cargo lash secures a cargo 20 to deck 13. In this figure, cargo lash tensioner 10 is shown in a secured position, as will be discussed hereinbelow.

Figure 2:
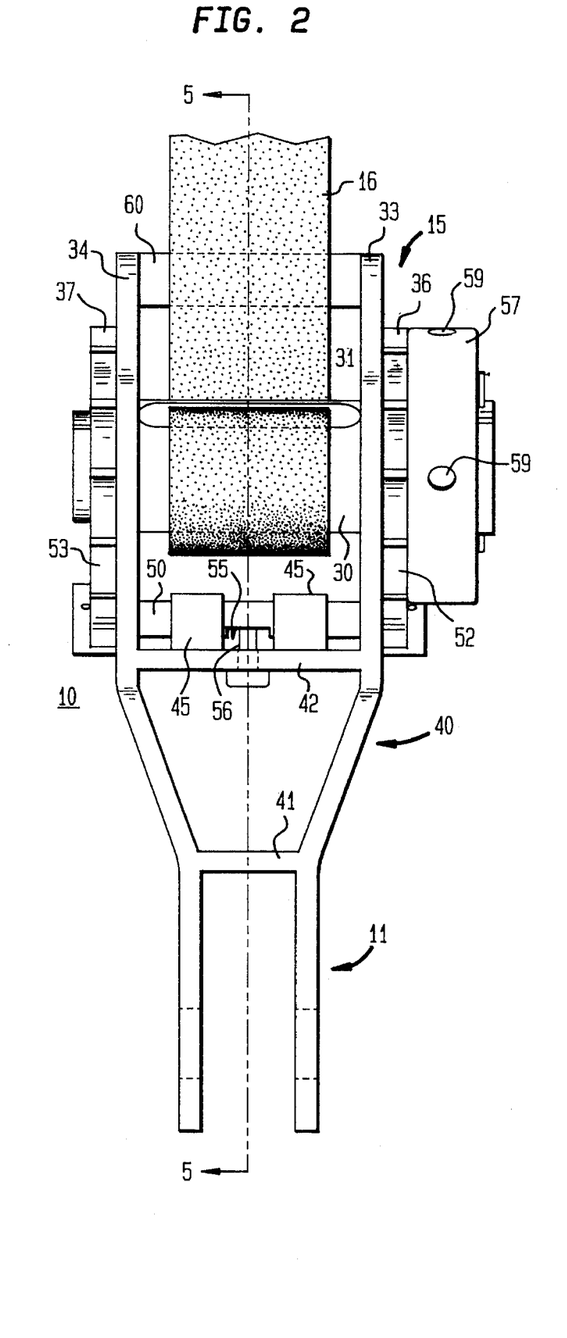
FIG. 2 is a top plan view of a cargo lash tightening arrangement constructed in accordance with the invention.

FIG. 2 is a top plan view of cargo lash tensioner 10 shown in FIG. 1. Cargo lash 16 is shown to be in the form of a strap and engaged around a spindle 30 that has a slot 31 therethrough. The cargo lash is inserted through slot 31. The spindle passes through apertures (not shown in this figure) in side walls 33 and 34 of second portion 15 of cargo lash tensioner 10. The side walls are, in this embodiment, parallel to one another. Ratchet wheels 36 and 37 are installed on spindle 30 so as to be rotatable therewith, and arranged external of the side walls.

Cargo lash tensioner 10, in addition to first portion 11 and second portion 15, has an intermediate portion 40. Side walls 33 and 34, in this embodiment, are continuous along the entire length of cargo lash tensioner 10. They are parallel to each other in first portion 11 and in second portion 15, and taper inwardly in intermediate portion 40. A first cross member 41 is arranged in the vicinity of the juncture of first portion 11 and intermediate portion 40. Similarly, a second cross member 42 is arranged across the side walls in the vicinity of the juncture of second portion 15 and intermediate portion 40.

In this embodiment, pawl shaft supports 45 are fixed onto second cross member 42 and are configured to engage rotatively with a pawl shaft 50. The pawl shaft extends through apertures (not shown in this figure) in side walls 33 and 34. Each end of the pawl shaft is coupled to a respective one of pawls 52 and 53. The pawls communicate with respective ones of ratchet wheels 36 and 37. Pawl shaft 50 has a flatted portion 55 that communicates with a resilient member 56 that applies a force that urges the pawl shaft into an orientation whereby pawls 52 and 53 communicate with the ratchet wheels. The resilient member is disposed in an aperture of second cross member 42, and may be engaged therewith by screw threads (not shown). Rotation of the resilient member varies the magnitude of the force applied against flatted portion 55, and consequently, the magnitude of the force that urges the pawls into engagement with the ratchet wheels. It is to be understood that persons of ordinary skill in the art can configure a resilient biasing arrangement, different from that disclosed in connection with this illustrative embodiment, that urges the pawl shaft in the appropriate direction of rotation, without exceeding the scope of the claimed invention.

Second portion 15 of cargo lash tensioner 10 has a lash guide 60 arranged on the other side of spindle 30 from pawl shaft 50. The lash guide serves the dual purposes of strengthening the second portion by securely coupling side walls 33 and 34 to one another, and facilitating a substantially axial alignment between cargo lash 16 and cargo lash tensioner 10, as is seen in FIGS. 1 and 3.

FIG. 2 additionally shows an adapter 57 engaged with spindle 30 so as to be rotatable therewith. The adapter is provided, in this embodiment, with a plurality of radial holes 59 which, as will be discussed below with respect to FIG. 4B, engage with a wrench that facilitates the application of a torque to the spindle. As will be described, a torque is applied to tighten or relax the cargo lash.

Figure 3:
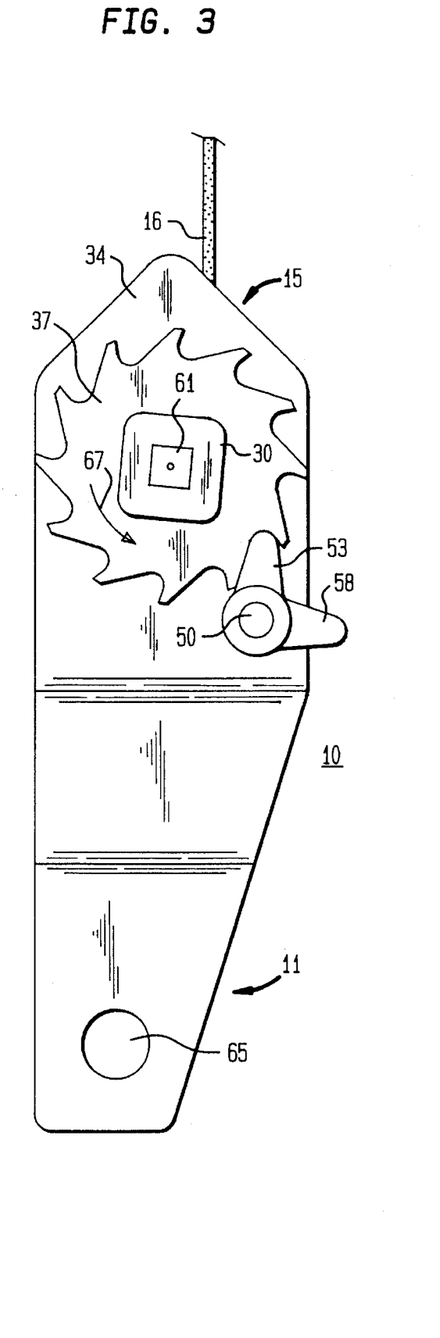
FIG. 3 is a side plan view of the embodiment of FIG. 2.

FIG. 3 is a side plan view of the embodiment of FIG. 2. As shown, pawl 53 is engaged with ratchet wheel 37. In this embodiment, pawl 53, which is installed on pawl shaft 50, has integrally formed therewith a handle portion 58 which is manipulable by a human operator (not shown) to cause disengagement of pawl 53 from ratchet wheel 37. Such disengagement permits the ratchet wheel to rotate clockwise, whereby the tensile force on cargo lash 16 is relaxed. A similar handle portion (not shown) may be formed with pawl 52 (not shown in this figure). Cargo lash tensioner 10 therefore can be operated easily by either right-handed or left-handed persons.

First portion 11 of cargo lash tensioner 10 is shown to have an aperture 65 through side wall 33, and a corresponding aperture (not shown in this figure) is provided through side wall 34. These apertures, which are round holes in this specific illustrative embodiment of the invention, are arranged to be coaxial, and enable the coupling of cargo lash tensioner 10 to deck coupler 12, as shown in FIG. 1. Persons of ordinary skill in the art can configure any number of arrangements in this first portion of the cargo lash tensioner to accommodate the various deck couplers that are available in the present state of the art, without exceeding the scope of the claimed invention.

Further with respect to FIG. 3, the end of spindle 30 is shown to have a square aperture 61 therein. This aperture, in this embodiment, receives the drive member of a conventional ratchet wrench (not shown) for tensioning and detensioning of cargo lash 16. Additionally, such an aperture 61 may be provided in certain embodiments in either or both ends of spindle 30. The use of such a square aperture reduces the cost of the cargo lash tensioner by avoiding the need of providing a tensioning handle with each unit, and also renders the tensioner unit operable using a conventional tool which is universally available. A specialty tool is therefore not required to operate the unit.

Figure 4A:
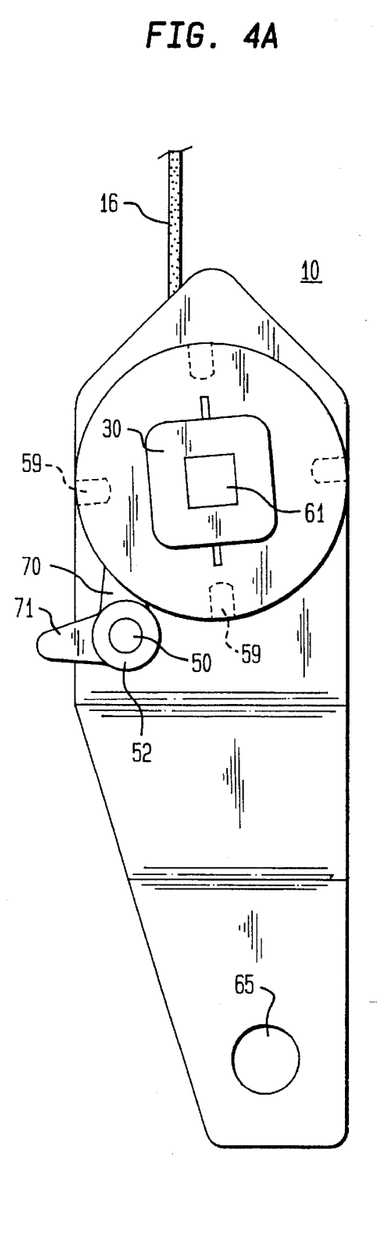
FIGS. 4A and 4B are side plan views which are useful to illustrate the application of a torque for releasing the tension on a cargo lash.
Figure 4B:
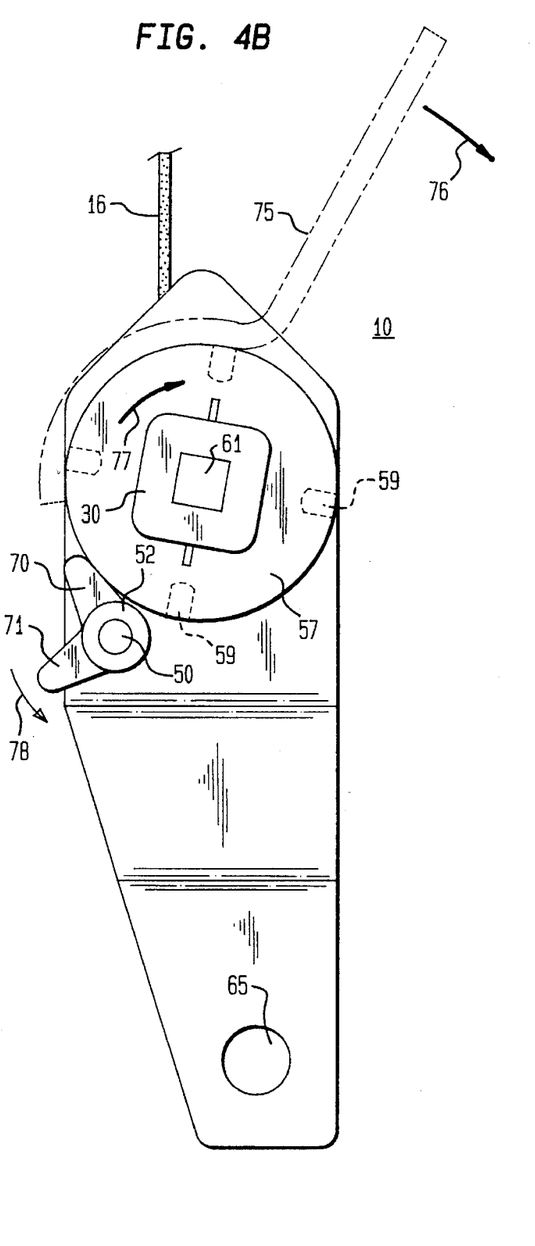

FIGS. 4A and 4B are side plan views which are useful to illustrate the application of a torque to release the tension on cargo lash 16. FIG. 4A shows cargo lash 16 with an applied tension that is maintained by operation of pawl 52, specifically its engagement portion 70 being in the engaged position with respect to ratchet wheel 36 (not shown in this figure). Ratchet wheel 36 is identical to ratchet wheel 37 shown in FIG. 3. Referring to FIG. 3 for the moment, it is seen that the teeth of the ratchet wheel are configured to engage pawl 53 in such a manner that the release of the tension on cargo lash 16 will require the application of a torque in the direction of arrow 67. In other words, the cargo lash must be tightened to permit release of pawl 53 by actuation of handle portion 58.

In FIG. 4A, pawl 52 and its associated handle portion 71 correspond in operation and configuration to pawl 53 and handle 58. Moreover, by virtue of the fact that both pawl/handle portions are engaged with pawl shaft 50, both pawls engage and disengage their respective ratchet wheels simultaneously, irrespective of which handle portion is manipulated by the operator (not shown).

In FIG. 4B, a special wrench 75 has been installed onto radial holes 59 of adapter 57. The specialty wrench is urged by the operator in the direction of arrow 76 whereby the adapter and the spindle, as well as the ratchet wheels, are rotated in the direction of arrow 77. By this arrangement, the tensile force in the cargo lash must be overcome before disengagement of the pawl from the ratchet wheel can be achieved. One of the handle portions is shown to have been manipulated in the direction of arrow 78, whereby pawls 52 and 53 are in disengaged positions with respect to the ratchet wheels. If it is desired to increase the tension on cargo lash 16 special wrench 75 is urged further in the direction of arrow 76, and the pawls are re-engaged while the wrench is repositioned on adapter 57. Alternatively, if release of tension on cargo lash 16 is desired, the wrench is mover in a direction opposite to that of arrow 76, and if necessary, the pawls are re-engaged while the wrench is repositioned on the adapter.

Figure 5:
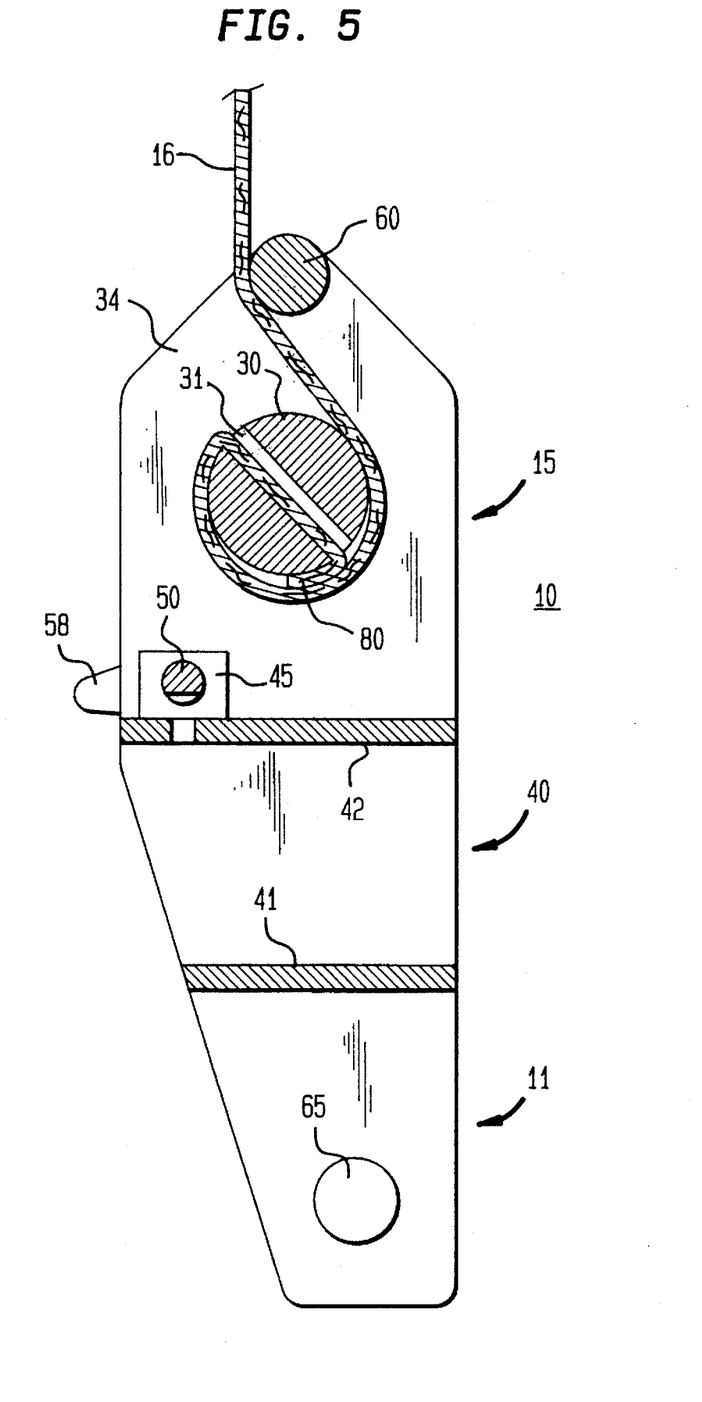
FIG. 5 is a partially cross-sectional representation of the specific illustrative embodiment of the invention shown in FIG. 2.

FIG. 5 is a partially cross-sectional representation of the specific illustrative embodiment of the invention shown in FIG. 2. As shown, spindle 30 of cargo lash tensioner 10 has cargo lash 16 arranged around it. In addition, the cargo lash is inserted through slot 31 in the spindle. In embodiments of the invention where cargo lash 16 is considerably longer than that shown in this figure, end 80 of cargo lash 16 may be arranged in the opposite direction, whereby the end of the cargo lash that extends beyond slot 31 is wound about the spindle in parallel with the tensioned portion of cargo lash 16.

Figure 6:
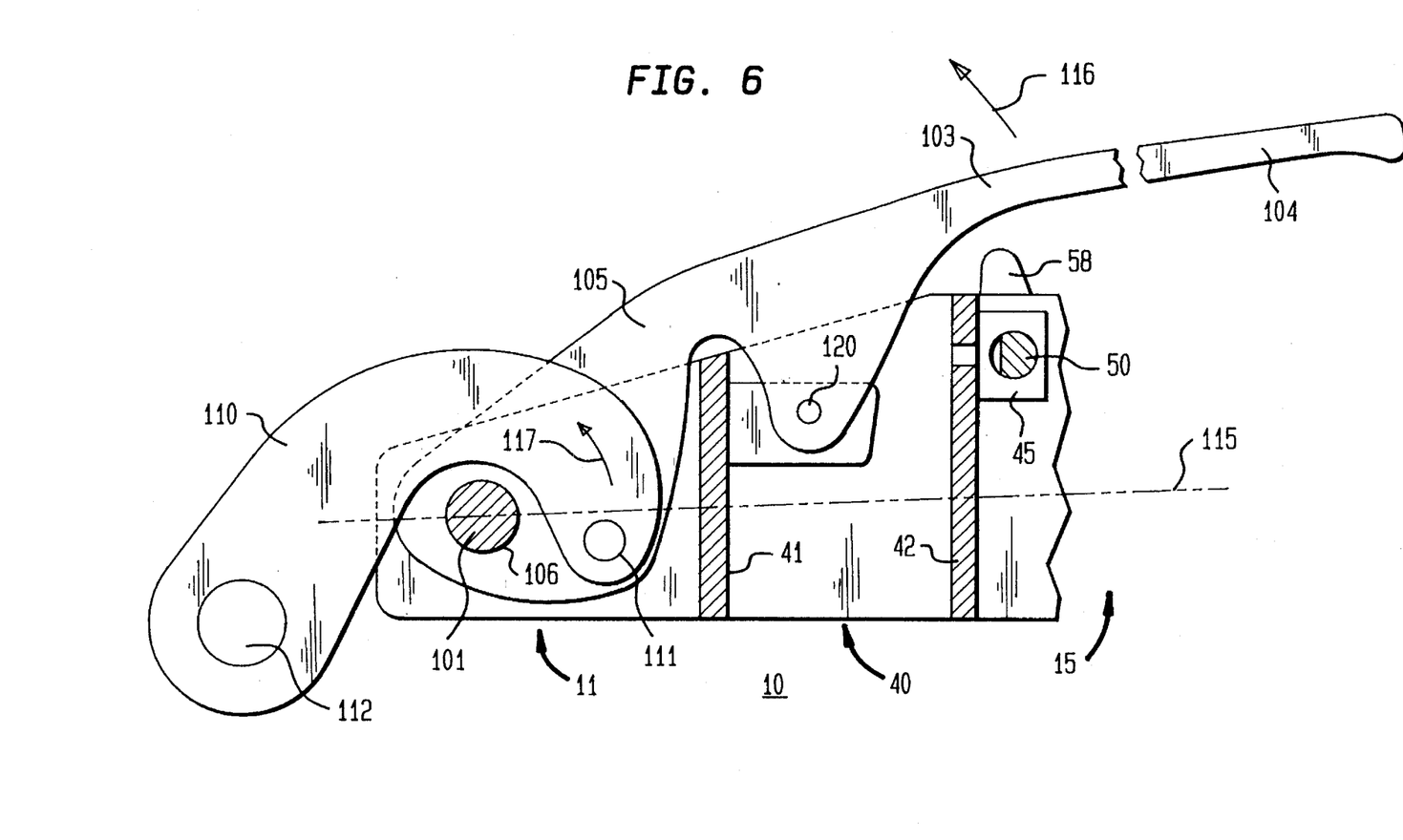
FIG. 6 is a partially fragmented and partially cross-sectional plan representation of a quick release arrangement adapted to the illustrative embodiment described above.

FIG. 6 is a partially fragmented and partially cross-sectional plan representation of a quick release arrangement adapted to the illustrative embodiment described above. Elements of structure that bear analogous correspondence to elements previously described are correspondingly designated. Aperture 65 (shown in FIG. 5) is provided with an axle 101, which is shown cross-sectionally in FIG. 6. As shown in FIG. 6, release handle 103 having an extended handle portion 104 and proximal portion 105 has an aperture 106 disposed in registration with aperture 65 so as to accommodate therethrough axle 101.

There is additionally shown in this figure a release coupler member 110 pivotally coupled to release handle 103 at proximal portion 105 thereof, specifically at a pivotal coupling 111. Release coupler member 110 is provided in this specific illustrative embodiment of the invention with an aperture 112 employed to couple with a deck coupler (not shown).

In the locked state, as shown in FIG. 6, the center of pivotal coupling 111 is disposed intermediate of an axis 115, which is defined by the cross-sectional centers of aperture 65 and lash guide 60 (as shown in FIG. 5), and the center of aperture 112. However, as release handle 103 is urged by an operator (not shown) of the unit in the direction of arrow 116, release coupler member 110 is urged in the direction of arrow 117, resulting initially in a shortening of the distance between the deck fitting (not shown) which would be coupled at aperture 112, and spindle 30 (not shown in this figure). However, as the center of pivotal coupling 111 crosses axis 115, this distance is increased. By this operation, tension on the lashing strap is immediately at least partially released. This reduces the amount of torque that the operator must apply to overcome the tension in the cargo lash during unloading. Moreover, a linking element (not shown) can be provided by persons skilled in the art between the quick release arrangement and the pawl shaft to achieve substantially simultaneous release of the ratchet wheels upon actuation of the quick release arrangement.

In other embodiments of the invention, a safety feature is provided which includes an aperture 120 through the release handle. This aperture is employed in any of several known latching arrangements (not shown) that serve to preclude accidental manipulation of the release handle, without first overcoming or otherwise releasing the latch. Such latching may be achieved by a through-pin (not shown), detent action, or any of a variety of other latching arrangements known to persons of skill in the art.

Although the invention has been described in terms of specific embodiments and applications, persons skilled in the art can, in light of this teaching, generate additional embodiments without exceeding the scope or departing from the spirit of the claimed invention. Accordingly, it is to be understood that the &awing and description in this disclosure are proffered to facilitate comprehension of the invention, and should not be construed to limit the scope thereof.

What is claimed is:

1. A tensioning apparatus for a cargo lashing strap, the cargo lashing strap being of the type that secures a cargo to a support base, the tensioning apparatus comprising:

a frame having a first portion adapted to couple said frame to the support base, an intermediate portion, and a second portion, said frame being further provided with first and second side walls each extending continuously along said first, intermediate, and second portions of said frame, said first and second side walls being parallel to one another in said first and second portions and tapering in said intermediate portion, there being further provided a first cross member coupling said first and second side walls to one another in said intermediate portion of said frame;

spindle means for receiving the cargo lashing strap, said spindle means having first and second spindle ends and being arranged to extend through apertures in said first and second side walls in said second portion of said frame, whereby said first and second spindle ends extend outward of respective ones of said first and second side walls;

first and second ratchet wheels arranged on respective ones of said first and second spindle ends, for rotating with said spindle means;

a pawl shaft having first and second pawl shaft ends and being arranged to extend through apertures in said first and second side walls in said second portion of said frame, whereby said first and second pawl shaft ends extend outward of respective ones of said first and second side walls, said pawl shaft being rotatable with respect to said frame, and having a flattened central portion arranged intermediate of said first and second pawl shaft ends;

first and second pawl members arranged on respective ones of said first and second pawl shaft ends, for rotating with said pawl shaft between engaged and disengaged positions with respect to respective ones of said first and second ratchet wheels, said pawl members being configured to engage said ratchet wheels in a manner wherein a tensile force in the cargo lash must be overcome to achieve disengagement of said pawls and their respectively associated ratchet wheels; and biasing means coupled to said first cross member for applying a resilient force to said pawl shaft so as to urge said first and second pawl members toward said engaged position.

2. The tensioning apparatus of claim 1 wherein said pawl shaft is rotatively coupled to said first cross member.

3. The tensioning apparatus of claim 2 wherein said biasing means comprises a compression spring coupled to said first cross member and extending to apply the resilient force to said flattened portion of said pawl shaft.

4. The tensioning apparatus of claim 3 wherein said biasing means further comprises adjustment means for adjusting the magnitude of compression loading on said compression spring.

5. The tensioning apparatus of claim 1 wherein there is further provided a torquing adapter means coupled to one of said spindle ends for facilitating the application of a cargo lash tightening torque thereto.

6. The tensioning apparatus of claim 5 wherein said torquing adapter means comprises means for receiving a standard ratchet drive wrench.

7. The tensioning apparatus of claim 1 wherein at least one of said pawl members is provided with a manipulable handle portion for facilitating manipulated movement of said first and second pawl members simultaneously between said engaged and disengaged positions with respect to respective ones of said first and second ratchet wheels.

8. The tensioning apparatus of claim 7 wherein said manipulable handle portion is formed integrally with said at least one of said pawl members.

9. The tensioning apparatus of claim 1 wherein there is further provided a second cross member arranged at the juncture of said first and intermediate portions of said frame.

10. The tensioning apparatus of claim 1 wherein there is further provided cargo lash guide means coupled to said first and second side walls in said second portion of said frame, and arranged on the other side of said spindle means with respect to said pawl shaft.

11. A system for lashing a cargo to a deck, deck being of the type having a lash coupler affixed thereto, the system being of the type having a lashing strap for securing the cargo, the system comprising:

a coupler arranged as a frame having first and second portions coupled to one another, said first portion being adapted to couple with the lash coupler, and said second portion being arranged to couple to the lashing strap, said second portion being further provided with;

a spindle having a slot for engaging with the lashing strap, said spindle being arranged to traverse said frame of said coupler and further being rotatable with respect thereto;

a ratchet wheel coupled to said spindle and arranged external of said frame;

a pawl shaft arranged to traverse said frame, said pawl shaft being rotatable with respect to said frame of said coupler, and being provided with a substantially central portion arranged to be disposed within said frame and adapted to receive a bias force applied thereto;

pawl means coupled to said pawl shaft, for rotating with said pawl shaft between engaged and disengaged positions with respect to said ratchet wheel;

resilient biasing means for applying the bias force to said central portion of said pawl shaft and urging said pawl shaft toward a predetermined rotational orientation with respect to said coupler means, whereby said pawl means is urged toward said engaged position with respect to said ratchet wheel; and handle means for facilitating application of a force counter to that of said resilient biasing means whereby said pawl means is urged toward said disengaged position with respect to said ratchet wheel.

12. The system of claim 11 wherein said second portion of said coupler is further provided with:

a further ratchet wheel coupled to said spindle at a distal end thereof with respect to said ratchet wheel and arranged external of said frame; and further pawl means coupled to said pawl shaft, for rotating with said pawl shaft between engaged and disengaged positions with respect to said further ratchet wheel, said further pawl means being urged toward said engaged position in response to said resilient biasing means.

13. The system of claim 11 wherein there is further provided a torquing adapter means coupled to one of said spindle ends for facilitating the application of torque thereto for tightening the lashing strap.

14. The system of claim 13 wherein said torquing adapter means comprises an annular member provided with a plurality of radial holes for facilitating engagement of a tightening tool whereby a human operator can apply a torque to said torquing adapter means.

15. The system of claim 13 wherein said torquing adapter means comprises means integrally formed with said spindle for engaging a drive member of a wrench.

16. The system of claim 11 wherein there is further provided a manipulable handle portion formed integrally with said pawl means.

17. The system of claim 11 wherein said first portion of said frame comprises first and second side walls parallel to one another, there being further provided coaxial apertures in said first and second side walls for engaging with the lash coupler.

18. A tensioning apparatus for a cargo lashing strap, the cargo lashing strap being of the type that secures a cargo to a cargo deck, the tensioning apparatus comprising:

a frame having a first portion adapted to couple said frame to the cargo deck, an intermediate portion, and a second portion, said frame being further provided with first and second side walls each extending continuously along said first, intermediate, and second portions of said frame, said first and second side walls being parallel to one another in said first and second portions and tapering in said intermediate portion, there being further provided a first cross member coupling said first and second side walls to one another in the vicinity of the juncture between said first and intermediate portions of said frame, and a second cross member coupling said first and second side walls to one another in the vicinity of the juncture between said second and intermediate portions of said frame;

spindle means for receiving the cargo lashing strap, said spindle means having first and second spindle ends and being arranged to extend through apertures in said first and second side walls in said second portion of said frame, whereby said first and second spindle ends extend outward of respective ones of said first and second side walls, said spindle means being further provided with an axial slot therethrough for engaging the cargo lashing strap;

adapter means coupled to said spindle means for facilitating engagement and disengagement of a torquing lever;

a ratchet wheel arranged on one of said first and second spindle ends, for rotating with said spindle means;

a pawl shaft having first and second pawl shaft ends and being arranged to extend through apertures in said first and second side walls in said second portion of said frame, whereby said first and second pawl shaft ends extend outward of respective ones of said first and second side walls, said pawl shaft being rotatively coupled to said second cross member, said pawl shaft being adapted to receive a biasing force toward a predetermined rotatory orientation with respect to said first and second side walls;

pawl means arranged on one of said pawl shaft ends, for rotating with said pawl shaft between engaged and disengaged positions with respect to said ratchet wheel, said pawl means having integrally formed therewith a manipulable handle portion for facilitating manipulated rotatory movement of said pawl means with respect to first and second side walls, between said engaged and disengaged positions with respect to said ratchet wheel;

biasing means coupled to said second cross member for applying the biasing force to said pawl shaft so as to urge said pawl means toward said engaged position; and cargo lash guide means coupled to said first and second side walls in said second portion of said frame, and arranged on the other side of said pawl shaft with respect to said spindle means.

19. The tensioning apparatus of claim 18 wherein said adapter means comprises an annular adapter having a plurality of radial holes therein.

20. The tensioning apparatus of claim 18 wherein said pawl shaft is provided with a flattened portion for communicating with said biasing means.

* * * * *